United States Patent
Li et al.

(12) 
(10) Patent No.: US 11,704,314 B2
(45) Date of Patent: Jul. 18, 2023

(54) MULTIPLEXING DATA OPERATION

(71) Applicant: INTERNATIONAL BUSINESS MACHINES CORPORATION, Armonk, NY (US)

(72) Inventors: Shuo Li, Beijing (CN); Xiaobo Wang, Beijing (CN); Sheng Yan Sun, BeiJing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 16/986,929

(22) Filed: Aug. 6, 2020

(65) Prior Publication Data

US 2022/0043817 A1 Feb. 10, 2022

(51) Int. Cl.
*G06F 16/24* (2019.01)
*G06F 16/2453* (2019.01)
*G06F 16/22* (2019.01)
*G06F 7/08* (2006.01)
*G06F 16/2455* (2019.01)

(52) U.S. Cl.
CPC .......... *G06F 16/24537* (2019.01); *G06F 7/08* (2013.01); *G06F 16/221* (2019.01); *G06F 16/2282* (2019.01); *G06F 16/2456* (2019.01)

(58) Field of Classification Search
CPC ....................................... G06F 16/24
USPC ........................................ 707/713
See application file for complete search history.

(56) References Cited

U.S. PATENT DOCUMENTS

| | | | |
|---|---|---|---|
| 5,864,842 A | 1/1999 | Pederson et al. | |
| 6,289,334 B1 | 9/2001 | Reiner | |
| 6,618,719 B1 | 9/2003 | Andrei | |
| 6,760,718 B2 | 7/2004 | Tamura | |
| 2009/0144346 A1* | 6/2009 | Duffy | G06F 16/24532 |
| 2014/0344244 A1* | 11/2014 | Weyerhaeuser | G06F 16/24532 707/713 |
| 2015/0234895 A1* | 8/2015 | Erdogan | G06F 16/2471 707/718 |
| 2019/0197175 A1* | 6/2019 | Purcell | G06F 16/2425 |
| 2020/0233661 A1* | 7/2020 | Grosse | G06F 16/24532 |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Syling Yen
(74) *Attorney, Agent, or Firm* — Anthony M. Pallone

(57) ABSTRACT

Embodiments of the present invention relate to a method, system, and computer program product for multiplexing data operation. In some embodiments, a method is disclosed. A query for at least one table comprising a plurality of data records is received. The query indicating a plurality of data operations to be performed on the plurality of data records. The plurality of data operations are combined into a target data operation. An intermediate result of the query is generated by performing the target data operation on the plurality of data records. A final result of the query is determined based on the intermediate result. In other embodiments, a system and a computer program product are disclosed.

19 Claims, 23 Drawing Sheets

(56) References Cited

OTHER PUBLICATIONS

Carroll, "Optimization of Joins", Oracle, Oracle8i Concepts, Release 8.1.5, A67781-01, 16 pages, https://docs.oracle.com/cd/F49540_01/DOC/server.815/a67781/c20c_joi.htm.

Selinger et al., "Access Path Selection in a Relational Database Management System", Originally published in the Proceedings of the 1979 ACM SIGMOD International Conference on the Management of Data, Digital recreation by Eric A. Brewer, Oct. 2002, pp. 23-34.

* cited by examiner

501

510

```
SELECT B.C3
FROM Tab AS A
      Inner Join Tab AS B
      ON A.C1 = B.C1
WHERE A.C2 = 'XXX'          511
      AND B.C3 <= 123       512
```

FIG. 5A

```
SELECT TEX.Count_Val, TEX.Sum_Val
FROM TABLE (SELECT Count(*), Sum (C4)
            FROM Tab AS A
            WHERE A.C4 <= 3
            GROUP BY A.C1, A.C2)
           AS TEX (Count_Val, Sum_Val)
WHERE (TEX.Count_Val, TEX.Sum_Val)
      > ANY (SELECT Count(*), Sum (C5)
             FROM Tab AS B
             WHERE B.C5 >= 5
             GROUP BY B.C2, B.C3)
```

SELECT ...
FROM TAB_1 AS A, TAB_2 AS B, TAB_3 AS C  ⟵ 811
WHERE A.C1 = B.C1 AND B.C2 = C.C2  ⟵ 813
    AND A.C2 >= 5
    AND B.C5 <= 12 AND C.C3 <= 10 AND  ⟵ 815
    B.C3 IN (SELECT B.C3
        FROM TAB_2 AS B, TAB_3 AS C,  ⟵ 812
        TAB_4 AS D
        WHERE B.C2 = C.C2 AND B.C3 = D.C3  ⟵ 814
        AND B.C4 >= 5 AND C.C1 >= 1)  ⟵ 816

810

Join composite

Join predicate of join composite

Local predicate of join composite

804

```
SELECT ...
FROM TAB_1 AS A, TAB_2 AS B, TAB_3 AS C   ⟵ 841
WHERE A.C1 = B.C1 AND B.C2 = C.C2   ⟵ 843
      AND A.C2 >= 5
      AND B.C5 <= 12 AND C.C3 <= 10 AND
      B.C3 IN (SELECT B.C3
               FROM TAB_2 AS B, TAB_3 AS C,   ⟵ 842
                    TAB_4 AS D
               WHERE B.C6 = C.C6  AND B.C3 = D.C3   ⟵ 844
                    AND B.C4 >=5 AND C.C1 >= 1 )
```

MULTIPLEXING DATA OPERATION

BACKGROUND

The present invention relates to the field of database, and more specifically, to multiplexing data operation.

Database join operation between base tables is widely used within Structured Query Language (SQL) statements. Join performance is very critical to the efficiency of SQL execution. In some scenarios, join performance wouldn't be well even though the join method or join sequence selection is optimal. Such a typical scenario is as follows: one table is referenced multiple times within an SQL statement.

SUMMARY

Various embodiments provide a method, computer program, and system for multiplexing data operation as described by the subject matter of the independent claims. Advantageous embodiments are described in the dependent claims. Embodiments of the present invention can be freely combined with each other if they are not mutually exclusive.

According to one embodiment of the present invention, there is provided a computer-implemented method. The present invention may include receiving a query for at least one table comprising a plurality of data records. The query indicating a plurality of data operations to be performed on the plurality of data records. The present invention may include combining the plurality of data operations into a target data operation. The present invention may include generating an intermediate result of the query by performing the target data operation on the plurality of data records. The present invention may include determining a final result of the query based on the intermediate result.

In advantageous embodiments, the plurality of data operations is used to select data records satisfying respective conditions from the plurality of data records. In advantageous embodiments, combining the plurality of data operations into the target data operation may include determining a union of the conditions as a target condition and combining the plurality of data operations into the target data operation to select data records satisfying the target condition from the plurality of data records.

In advantageous embodiments, generating the intermediate result of the query may include selecting data records satisfying the target condition from the plurality of data records and generating the intermediate result of the query by dividing the selected data records into a plurality of groups, each group satisfying one of the conditions.

In advantageous embodiments, the plurality of data operations is connected by a join operation and determining the final result of the query may include determining the final result of the query by performing the join operation on the plurality of groups of data records.

In advantageous embodiments, the conditions are associated with a same column of the at least one table and performing the target data operation on the at least one table may include performing the target data operation on the column of the at least one table.

In advantageous embodiments, the plurality of data operations may include a first data operation grouping a first set of data records based on a first set of columns and a second data operation grouping a second set of data records based on a second set of columns. In advantageous embodiments, combining the plurality of data operations into the target data operation may include, in accordance with a determination that the first and second sets of columns include a same column, determining a union of the first set of columns and the second set of columns as a set of sorting keys, the same column acting as a leading key of the set of sorting keys, determining a third set of data records based on the first and second set of data records, and combining the first and second data operations into the target data operation to sort the third set of data records based on the set of sorting keys.

In advantageous embodiments, generating the intermediate result of the query may include sorting the third set of data records based on the set of sorting keys, generating a first grouping result by grouping the sorted third set of data records based on the first set of columns and a second grouping result by grouping the sorted third set of data records based on the second set of columns, and generating the intermediate result based on the first and second grouping results.

In advantageous embodiments, the query indicates a first condition for selecting the first set of data records from the plurality of records and a second condition for selecting the second set of data records from the plurality of records. In advantageous embodiments, determining the third set of data records may include determining a union of the first and second conditions as a target condition and selecting from the at least one table the third set of data records satisfying the target condition.

In advantageous embodiments, the at least one table includes first and second tables and the plurality of data operations includes a plurality of join operations to be performed on the first and second tables. In advantageous embodiments, combining the plurality of data operations into the target data operation may include, in accordance with a determination that the plurality of join operations are associated with a same join condition, combining the plurality of data operations into the target data operation to join a first set of data records from the first table and a second set of data records from the second table based on the join condition.

In advantageous embodiments, generating the intermediate result of the query may include generating the intermediate result of the query by joining the first set of data records from the first table and the second set of data records from the second table based on the join condition.

In advantageous embodiments, the query indicates a plurality of conditions for selecting the first set of data records from the first table. In advantageous embodiments, the present invention may include determining a union of the plurality of conditions as a target condition and selecting from the first table the first set of data records satisfying the target condition.

According to another embodiment of the present invention, there is provided a system. The system comprises a processing unit and a memory coupled to the processing unit. The memory stores instructions that, when executed by the processing unit, perform actions including: receiving a query for at least one table comprising a plurality of data records, the query indicating a plurality of data operations to be performed on the plurality of data records; combining the plurality of data operations into a target data operation; generating an intermediate result of the query by performing the target data operation on the plurality of data records; and determining a final result of the query based on the intermediate result.

According to yet another embodiment of the present invention, there is provided a computer program product. The computer program product is tangibly stored on non-transient machine-readable medium and includes machine-executable instructions. The machine-executable instructions, when executed on a device, cause the device to perform actions including: receiving a query for at least one table comprising a plurality of data records, the query indicating a plurality of data operations to be performed on the plurality of data records; combining the plurality of data operations into a target data operation; generating an intermediate result of the query by performing the target data operation on the plurality of data records; and determining a final result of the query based on the intermediate result.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIGS. 5A-5D depict schematic diagrams for multiplexing table-scan according to some embodiments of the present disclosure.

FIGS. 7A-7E depict schematic diagrams for multiplexing sort operation according to some embodiments of the present disclosure.

FIGS. 8A-8D depict schematic diagrams for multiplexing join operation according to some embodiments of the present disclosure.

DETAILED DESCRIPTION

Figure 1:
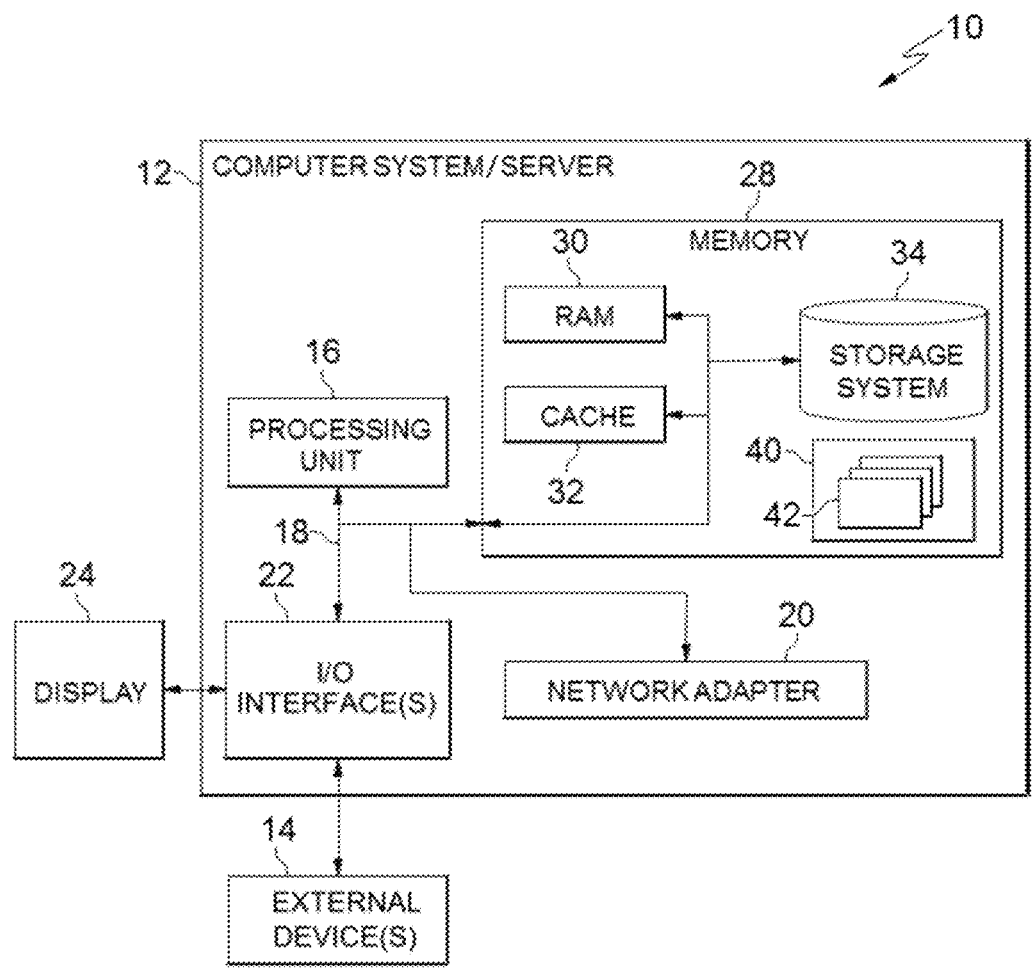
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a memory 28, and a bus 18 that couples various system components including memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
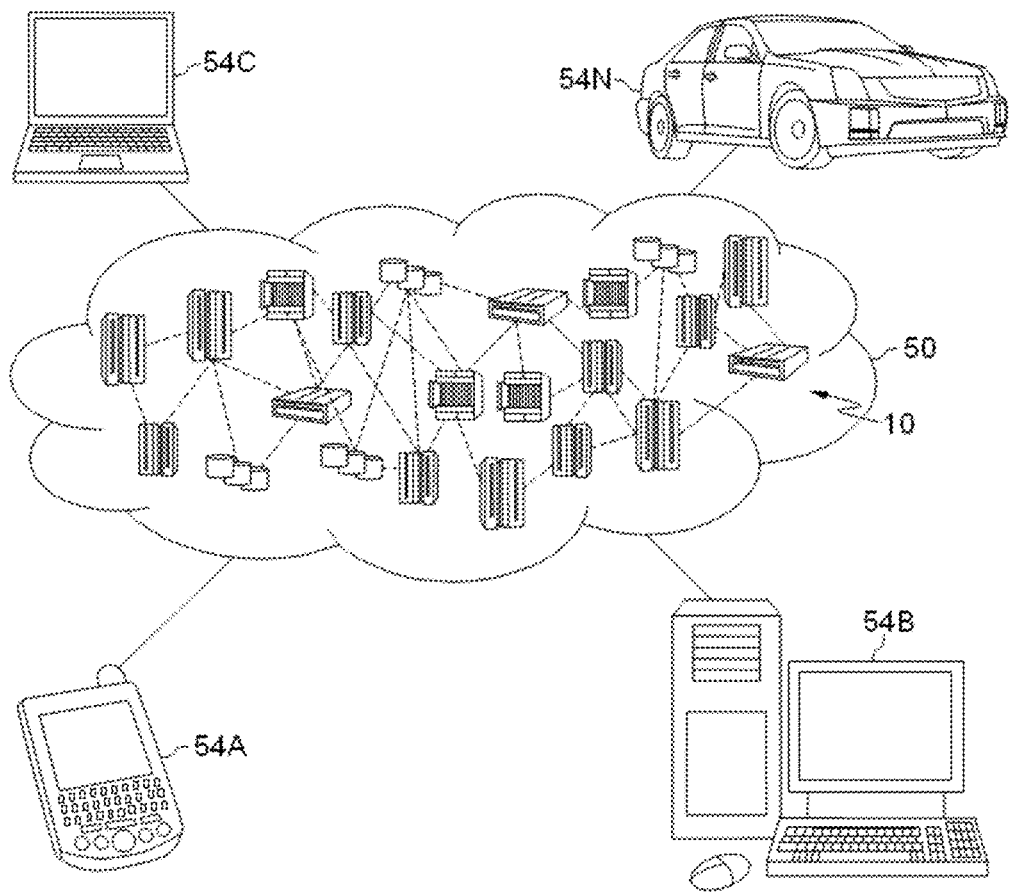
FIG. 2 depicts a cloud computing environment according to an embodiment of the present invention.

Referring now to FIG. 2, illustrative cloud computing environment 50 is depicted. As shown, cloud computing environment 50 includes one or more cloud computing node 10 with which local computing devices used by cloud consumers, such as, for example, personal digital assistant (PDA) or cellular telephone 54A, desktop computer 54B, laptop computer 54C, and/or automobile computer system 54N may communicate. Multiple cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing node 10 and cloud computing environment 50 can communicate with any type of computerized device over any type of network and/or network addressable connection (e.g., using a web browser).

Figure 3:
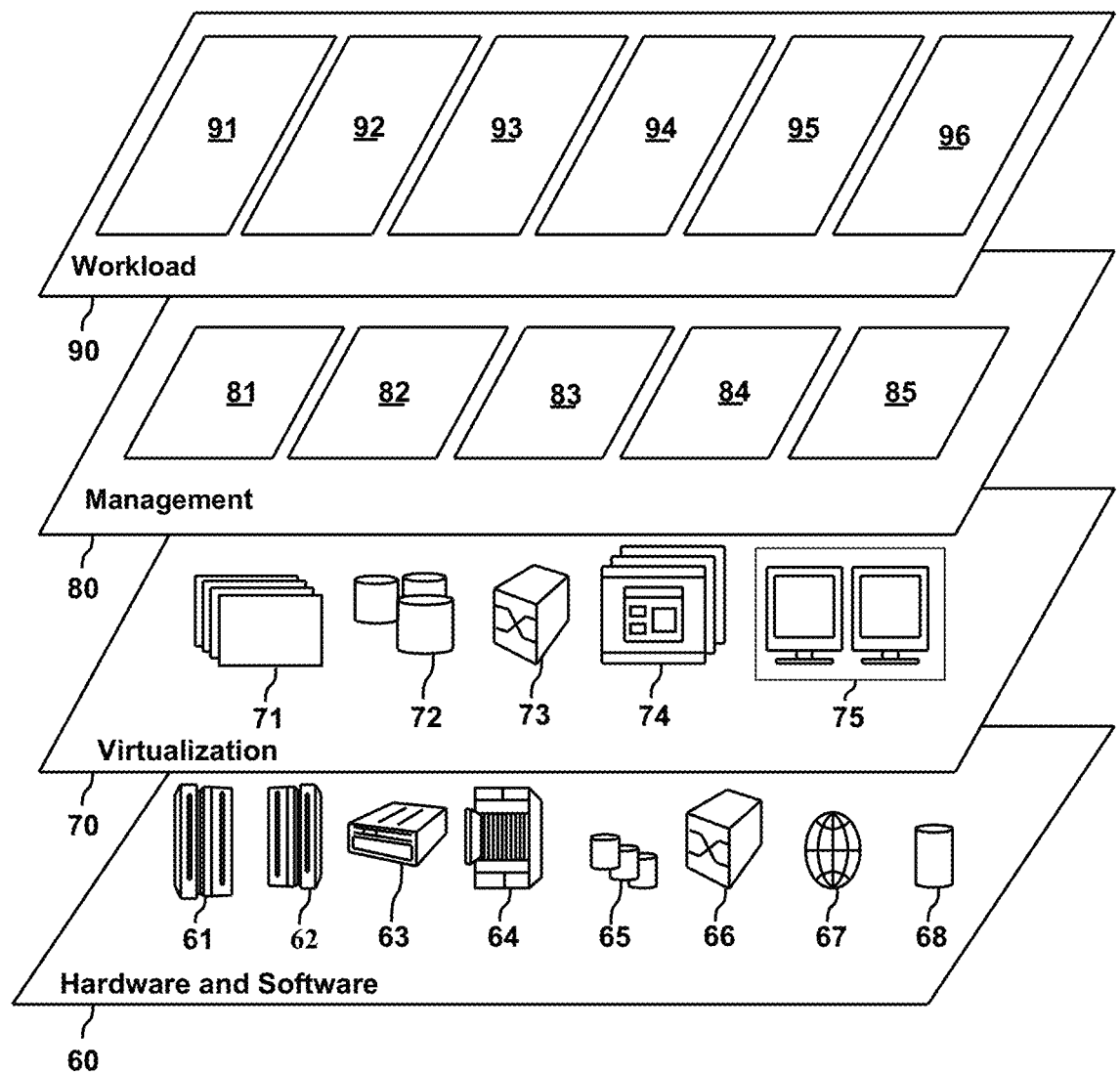
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data operation multiplexing 96. Hereinafter, reference will be made to FIGS. 4-9 to describe details of the database operation multiplexing 96.

As mentioned above, in some scenarios, one table may be referenced multiple times in a query for example within an SQL statement. Such scenarios may occur when non-relational data is represented in a relational database. As an example, an organization structure usually has a tree topology. To represent the organization structure in a relational database, a table named "MyDepartment" may be used for example and may have columns of "DepartmentID", "DepartmentName" and "ParentID". For a record or a row in the table, the column "ParentID" would have a value same as the value of the column "DepartmentID" to which the record belongs. For example, a department named "Senior Manager" may have a "DepartmentID" of 6 and another department named "Project Leader" belongs to the department named "Senior Manager". In this case, record for the department named "Project Leader" would have a "ParentID" of 6.

To query all the departments which are under the department "Senior Manager", a SQL statement may be as below:

```
SELECT B.DepartmentName
FROM MyDepartment AS A
    Inner Join MyDepartment AS B
    ON B.ParentID = A.DepartmentID
    WHERE A.DepartmentName = 'Senior Manager'
```

As can be seen, the table named "MyDepartment" is referenced twice by the inner join operation. Join performance would be poor when Filter Factor (FF) is not good, such as: FF>0.3. Due to bad FF, table-scan rather than index-scan may be used to access both the base tables "A" and "B". However, performance would still be poor, since the base table "MyDepartment" is accessed multiple times (twice in this example) according to join method, such as Nest Loop Join, Sort Merge Join.

Some conventional solutions have been proposed to reduce search scope of a query. For example, according to a conventional solution, a "Materialized Query Table/View" (MQT/MQV) may be created. The MQT/MQV may only comprise some of the records in the base table. For example, records with a value for a particular column below a threshold may be included in the MQT/MQV. Therefore, for some queries referencing the base table, the MQT/MQV instead of the base table would be searched.

However, such a conventional solution has certain drawbacks. For example, additional storage space is required to store the MQT/MQV and data in the MQT/MQV and base table need to be synchronized frequently. Moreover, the performance of a SQL statement cannot be optimized if the predicate of the SQL statement is out of the range of the predicate definition of the MQT/MQV.

In order to at least partially solve the above and other potential problems, embodiments of the present disclosure provide a advantageous solution for multiplexing data operation. According to embodiments of the present disclosure, a query for at least one table comprising a plurality of data records is received. If the received query indicates a plurality of data operations to be performed on the plurality of data records, the plurality of data operations is combined into a target data operation. In other words, the target data operation is multiplexed. For example, table-scan, index-scan, sort operation and join operation can be multiplexed. As an example, the plurality of data operations may comprise multiple table-scan operations on the table based on different condition or local predicates. The target data operation may be a single table-scan based on a combined local predicate. An intermediate result of the query is generated by performing the target data operation on the plurality of data records. For example, the intermediate result may be implemented as appropriate work files. Next, a final result of the query is determined based on the intermediate result. For example, the generated work files may be used to proceed with the remaining operation indicated by the query. In the embodiments of the present disclosure, data operation is multiplexed to reduce the times for processing the same table(s). For example, the times for accessing the same table, the times for sorting the same table and/or the times for joining the same tables can be reduced. As such, the database query performance can be improved by embodiments of the present disclosure.

Figure 4:
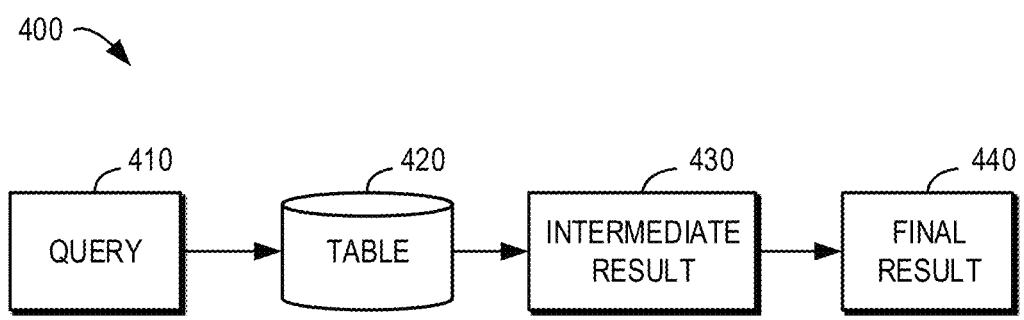
FIG. 4 depicts an environment in which embodiments of the present disclosure can be implemented.

With reference now to FIG. 4, an environment 400 in which embodiments of the present disclosure can be implemented is shown. It is to be understood that the structure and functionality of the environment 400 are described only for the purpose of illustration without suggesting any limitations as to the scope of the present disclosure.

As shown in FIG. 4, a table 420 in a database (not shown) may comprise a plurality of data records which may comprise one or more column. A query 410 for the table 420 may be received. The query 410 may indicate a plurality of data operations to be performed on the plurality of data records of the table 420. For example, the table 420 may be referenced multiple times in a SQL statement for the query 410.

The plurality of data operations may be combined into a target data operation. In other words, the target data operation is multiplexed. Then, instead of performing the plurality of data operations separately, the target data operation is performed on the plurality of data records of the table 420 to generate an intermediate result 430. The intermediate result 430 may comprise a plurality of sets of data records each satisfying respective conditions related to the plurality of data operations. For example, the intermediate result 430 may be implemented as different work files. A final result 440 of the query 410 is determined based on the intermediate result 430.

In some embodiments, the query 410 may indicate a plurality of scan operations to select data records satisfying respective conditions from the plurality of data records. For example, the table 420 may be referenced by a join operation multiple times and each reference is associated with different local predicates. The terms "condition" and "predicate" may be used interchangeably herein. The plurality of scan operations may comprise a plurality of table-scans or a plurality of index-scans. In such embodiments, the plurality of table-scans or the plurality of index-scans may be combined into a single scan operation. In other words, table-scan or index scan is multiplexed.

In some embodiments, the query 410 may indicate a plurality of data operations to group data records of the table 420 based on different sets of columns. In such embodiments, sort operations may be combined into a single sort operation. In other words, sort is multiplexed.

In some embodiments, the query 410 may indicate a plurality of join operations to join records of the table 420 and another table (not shown) based on a same join predicate. In such embodiments, the plurality of join operations may be combined into a single join operation based on the same join predicate. In other words, join is multiplexed.

Some example embodiments are now described below in detail. In some embodiments, table-scan may be multiplexed, for example if a same table is referenced multiple times in a query. Reference is now made to FIGS. 5A-5D, which depict schematic diagrams for multiplexing table-scan according to some embodiments of the present disclosure. In the schematic diagram 501, a query 510 in a form of a SQL statement may be an example of the query 410. In the query 510, the table named "Tab" (which may be referred to as Tab hereinafter) is referenced twice by the inner join operation. The query 510 indicates a first table-scan of the Tab to select records satisfying the local predicate 511, which is a scan condition when the Tab is treated as table A. The query 510 also indicates a second table-scan of the Tab to select records satisfying the local predicate 512, which is a scan condition when the Tab is treated as table B. In this example, the first and second table-scans are connected by the inner join operation.

Figure 5B:
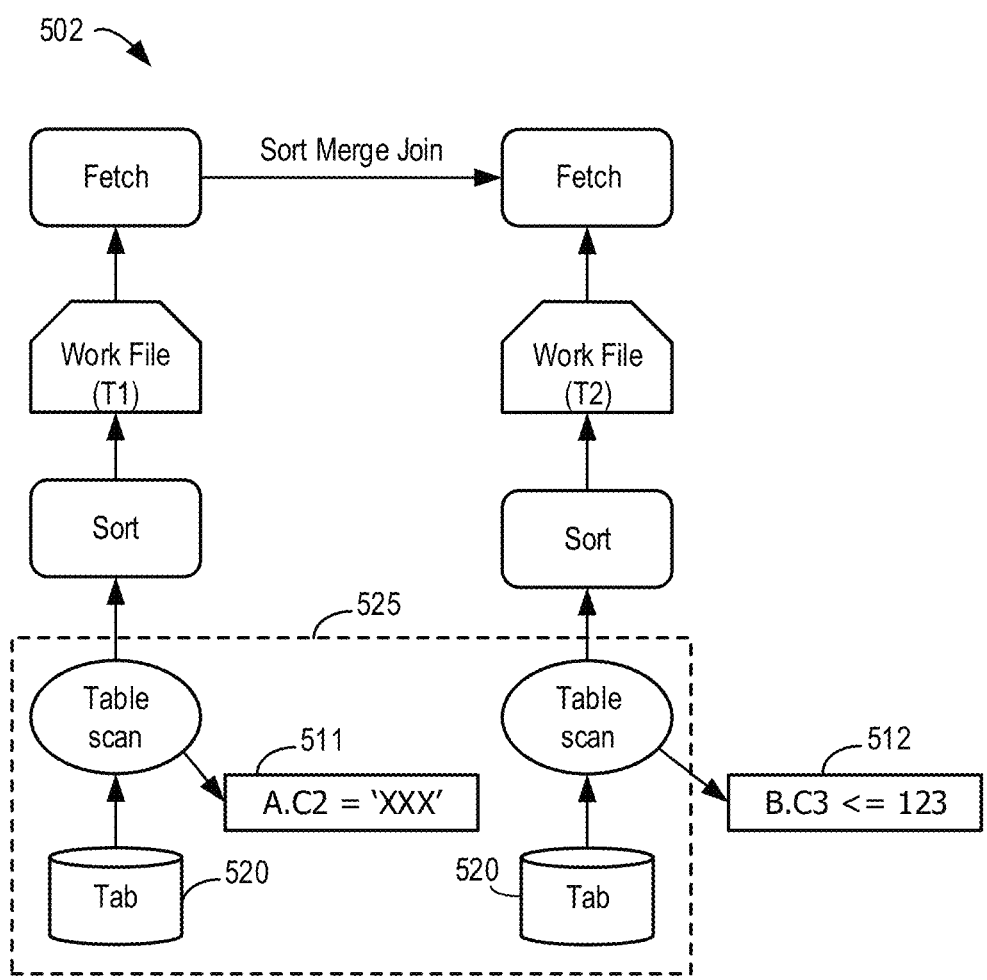
Figure 5C:
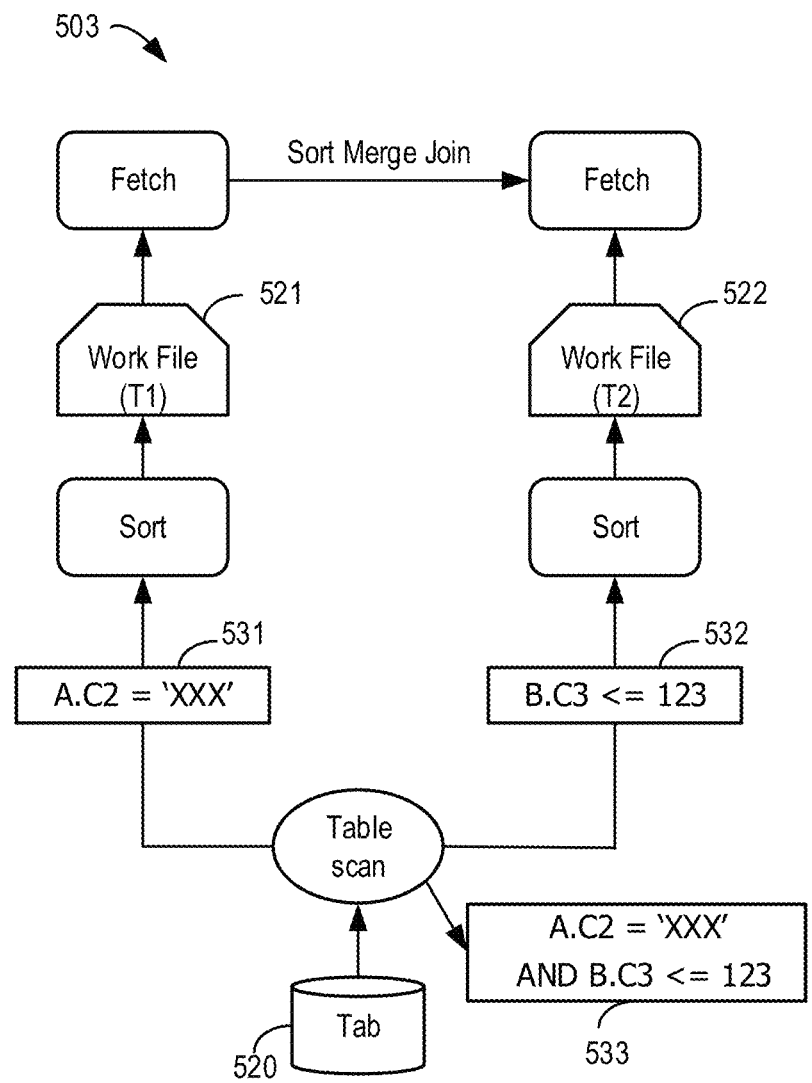

FIG. 5B depicts an execution path 502 for the query 510 where the table scan is not multiplexed. The join sequence is from A to B and join method is a sort merge join. As shown in the sub path 525, the Tab 520 is a table scanned twice based on the local predicates 511 and 512, respectively. FIG. 5C depicts an execution path 503 for the query 510 where the table-scan is multiplexed according to some embodiments of the present disclosure. To multiplex the table-scan, the local predicates 511 and 512 are located and a target condition may be determined based on the local predicates 511 and 512. For example, a union operation and an intersection operation may be performed on the local predicates 511 and 512. The target condition, which in this example may be also referred to as a combined local predicate, may be determined as a union of the local predicates 511 and 512. Accordingly, the combined local predicate may comprise a first portion 531, a second portion 532 and a third portion 533.

The first and second table-scans are combined into a single table-scan under the combined local predicate. A single table-scan process is then performed on the Tab 520 to select data records satisfying the combined local predicate from the plurality of data records of the Tab 520. The selected data records are then divided into two groups as the intermediate result, each group satisfying one of the local predicates 511 and 512. In the example of FIG. 5C, two work files 521 and 522 are generated as a result of the single table-scan process to store the selected data records. Records in the work file 521 may satisfy the local predicate 511 and records in the work file 522 may satisfy the local predicate 512.

During the single table-scan process, each record or each row of the Tab 520 is evaluated based on the combined local predicate. If a record satisfies the combined local predicate, the record may be further evaluated based on the local predicates 511 and 512. If the record merely satisfies the local predicate 511 corresponding to the first portion 531, the record will be added to the work file 521. For example, if the value of C2 column of a record is "XXX" while the value of C3 column of the record is larger than 123, this record will be added to the work file 521. If the record merely satisfies the local predicate 512 corresponding to the second portion 532, the record will be added to the work file 522. For example, if the value of C2 column of a record is not "XXX" while the value of C3 column of the record is smaller than 123, this record will be added to the work file 522. If the record satisfies both the local predicates 511 and 512 corresponding to the third portion 533, the record will be added to both the work files 521 and 522. For example, if the value of C2 column of a record is "XXX" while the value of C3 column of the record is smaller than 123, this record will be added to both the work files 521 and 522. In this way, multiple table-scans are consolidated into a single scan process.

Next, the intermediate result, for example the generated work files 521 and 522, can be used to proceed with the remaining process to determine the result of the query 510. For example, as shown in FIG. 5C, a sort merge join operation may be performed on the work files 521 and 522.

In some embodiments, as shown in FIG. 5C, the records selected from the Tab 520 based on the combined local predicate may be sorted to generate the work files 521 and 522.

Figure 5D:
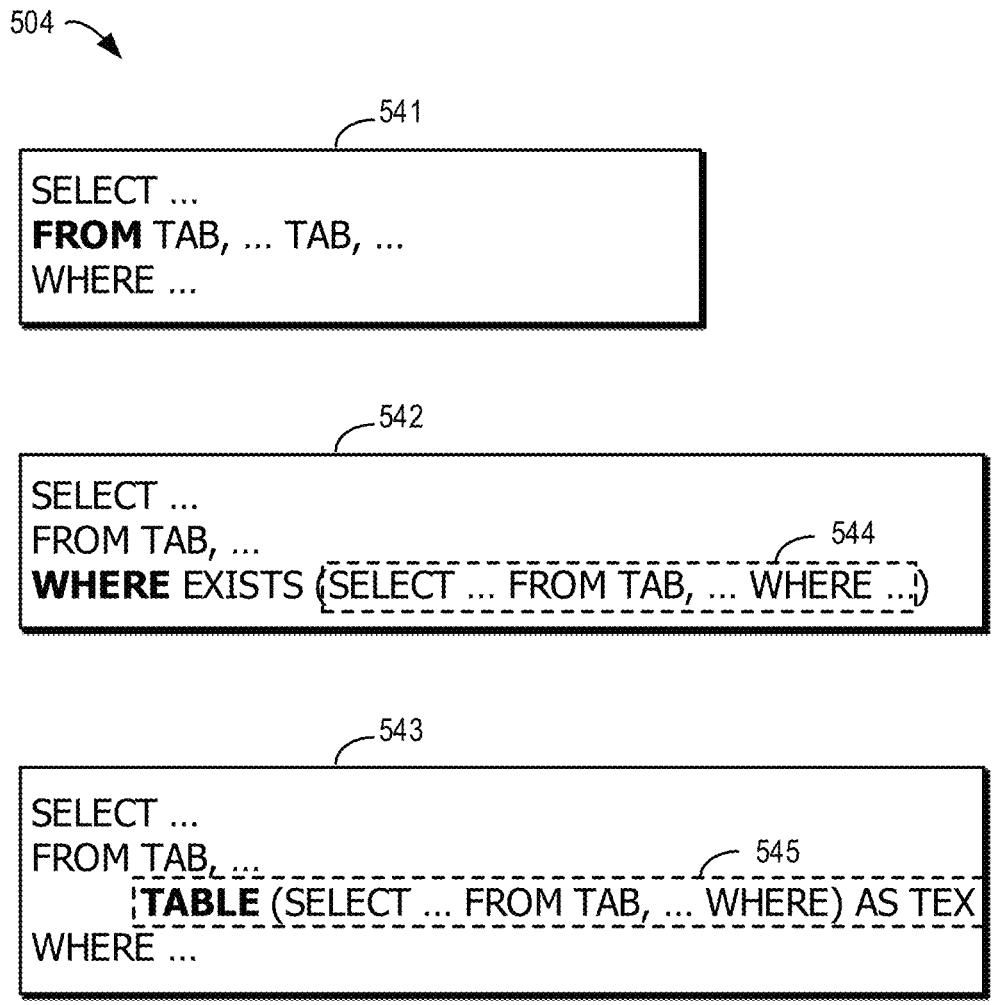

In the example SQL statement shown in FIG. 5A, the same table (which is the Tab) is referenced twice in the FROM clause. It is to be understood that FIG. 5A merely shows an example without limitation. The table-scan can be multiplexed when the same table is referenced more than one time in a query. For example, the same table may be referenced more than one time in at least one of the FROM clause, TABLE expression and sub-query. The schematic diagram 504 in FIG. 5D shows some example queries 541, 542 and 543 in form of SQL statement where the table-scan can be multiplexed. In the example query 541, the table "TAB" is referenced twice in the FROM clause. In the example query 542, the table "TAB" is referenced in the FROM clause and the sub-query 544. In the example query 543, the table "TAB" is referenced in the FROM clause and the TABLE expression 545.

In such embodiments, table-scan is multiplexed to reduce the times on same table access. In this way, database query performance can be improved significantly. Experiments show that database query may have a performance improvement of about 28.69%~57.43% with the table-scan multiplex.

In some embodiments, index-scan may be multiplexed, for example if the local predicates specify a common column on which the index of the table is defined. Reference is now made to FIGS. 6A-6E, which depict schematic diagrams for multiplexing table-scan according to some embodiments of the present disclosure. In the schematic diagram 601, a query 610 in a form of a SQL statement may be an example of the query 410. In the query 610, the table named "Tab" (which may be referred to as Tab hereinafter) is referenced twice by the inner join operation with a join predicate 613. The index of the Tab is created on the columns C1 and C2. The query 610 indicates a first index-scan of the Tab to select records satisfying the local predicate 611, which is a scan condition when the Tab is treated as table A. The query 610 also indicates a second index-scan of the Tab to select records satisfying the local predicate 612 and also the join predicate 613, which is a scan condition when the Tab is treated as table B. In this example, the first and second index-scans are connected by the inner join operation.

Figure 6A:
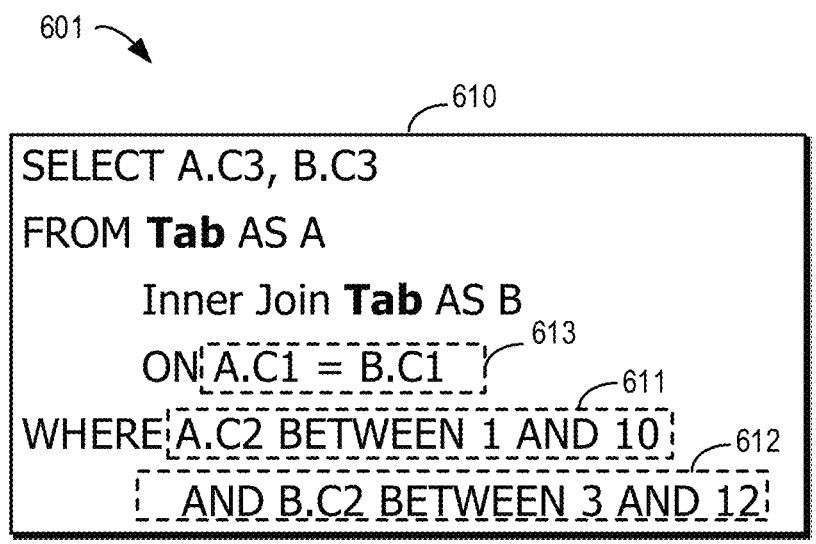
FIGS. 6A-6E depict schematic diagrams for multiplexing index-scan according to some embodiments of the present disclosure.
Figure 6B:
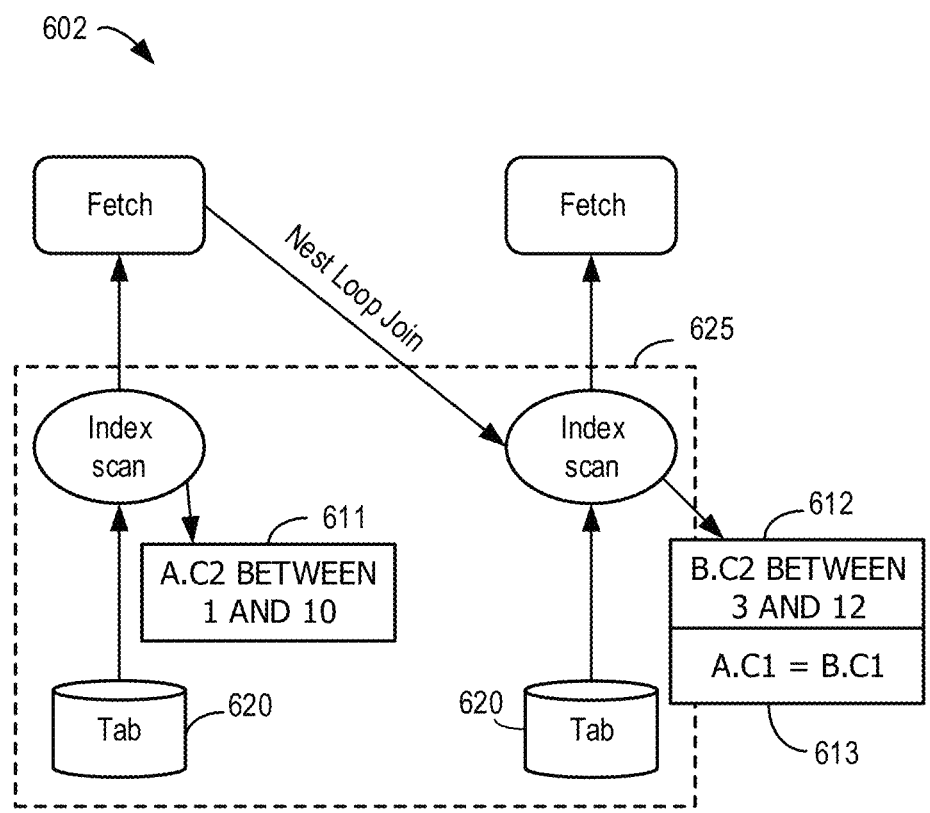
Figure 6C:
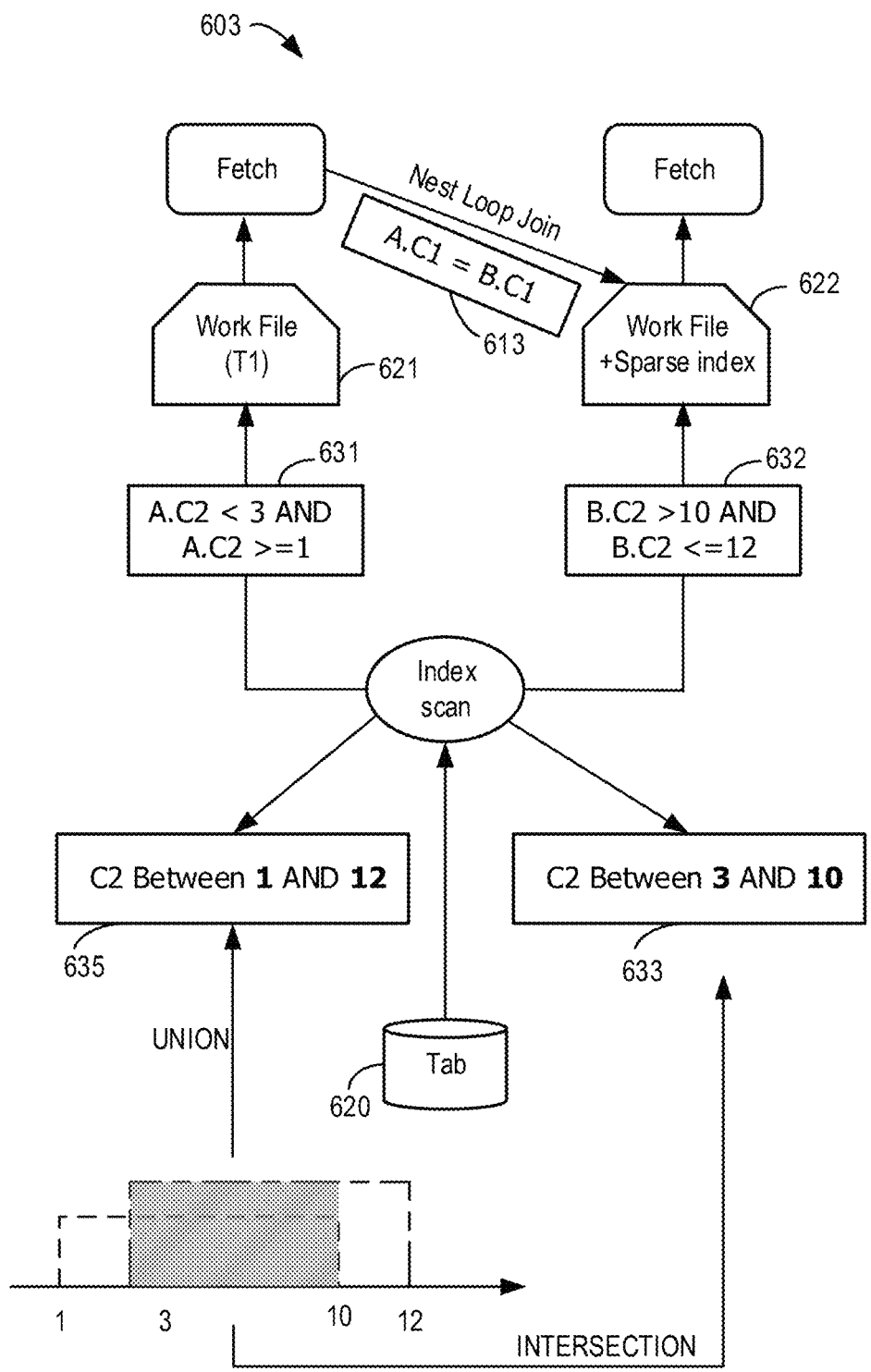

FIG. 6B depicts an execution path 602 for the query 610 where the index-scan is not multiplexed. The join sequence is from A to B and join method is a nest loop join. As shown in the sub path 625, the Tab 620 is index-scanned based on the local predicate 611 and also index-scanned based on the local predicate 612 and the join predicate 613. FIG. 6C depicts an execution path 603 for the query 610 where the index-scan is multiplexed according to some embodiments of the present disclosure. To multiplex the index-scan, the local predicates 611 and 612 are located and at least one common column of the local predicates 611 and 612 where the index is defined on is located. In this example, the C2 column is the common column where the index is defined on. A target condition may be determined based on the local predicates 611 and 612. For example, a union operation and an intersection operation may be performed on the local predicates 611 and 612. The target condition, which in this example may be also referred to as a combined local predicate 635, may be determined as a union of the local predicates 611 and 612. Accordingly, the combined local predicate 635 may comprise a first portion 631, a second portion 632 and a third portion 633, which is an intersection of the local predicates 611 and 612.

The first and second index-scans are combined into a single table-scan under the combined local predicate. A single index-scan process is then performed on the Tab 620 to select data records satisfying the combined local predicate 635 from the plurality of data records of the Tab 620. The selected data records are then divided into two groups as the intermediate result, each group satisfying one of the local predicates 611 and 612. In the example of FIG. 6C, two work files 621 and 622 are generated as a result of the single index-scan process to store the selected data records. Records in the work file 621 may satisfy the local predicate 611 corresponding to the first portion 631 and the third portion 633, while records in the work file 622 may satisfy the local predicate 612 corresponding to the second portion 632 and the third portion 633.

During the single index-scan process, the index column (which is the C2 column in this example) of the Tab 620 is evaluated based on the combined local predicate 635. If the value of the index column of a record satisfies the combined local predicate 635, the record may be further evaluated based on the local predicates 611 and 612. If the record satisfies the third portion 633 corresponding to the intersection of the local predicates 611 and 612, the record will be added to both the work files 621 and 622. For example, if the value of C2 column of a record is 5, this record will be added to both the work files 621 and 622. If the record merely satisfies the first portion 631, the record will be added to the work file 621. For example, if the value of C2 column of a record is 2, this record will be added to the work file 621. If the record merely satisfies the second portion 632, the record will be added to the work file 622. For example, if the value of C2 column of a record is 11, this record will be added to the work file 622. In this way, multiple index-scans are consolidated into a single scan process.

Next, the intermediate result, for example the generated work files 621 and 622, can be used to proceed with the remaining process to determine the result of the query 610. For example, as shown in FIG. 6C, a nest loop join operation with the join predicate 613 may be performed on the work files 621 and 622. In some embodiments, the selected records in the work files 621 and 622 may be sorted. For example, as shown in FIG. 6C, the records in the work file 622 may be sorted. A sparse index may be added in order to avoid full scan of the records in the work file 622 when the nest loop join is performed.

Figure 6D:
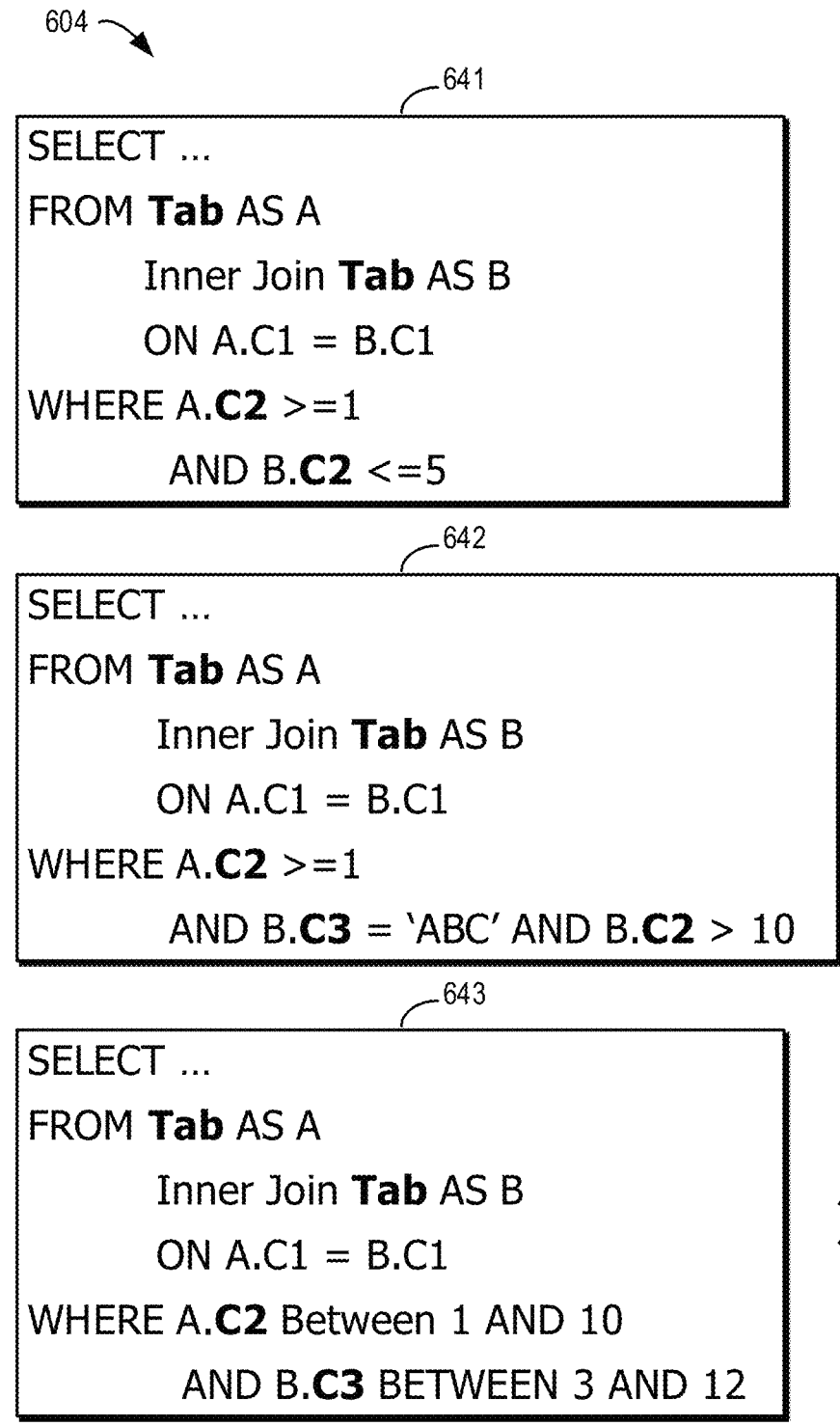

It is to be understood that the example SQL statement shown in FIG. 6A is merely an example without limitation. The index-scan can be multiplexed when there exists at least one common column between the local predicates where the index is defined on. The schematic diagram 604 in FIG. 6D shows some example queries 641, 642 and 643 in form of SQL statement. In each of the example queries 641 and 642, the table "Tab" is referenced twice in the FROM clause and the local predicates specify a common column of the Tab, that is the C2 column on which the index is defined on. Therefore, index-scan can be multiplexed for the example queries 641 and 642. In the example query 643, the table "Tab" is referenced twice in the FROM clause whereas there is no common column between the local predicates. Therefore, index-scan cannot be multiplexed for the example query 643. However, table-scan as described above can be multiplexed for the example query 643.

In such embodiments, index-scan is multiplexed to reduce the times on same table access. In this way, database query performance can be improved significantly. Experiments show that database query may have a performance improvement of about 17.64%~38.86% with the index-scan multiplex. The more overlap among the ranges of the local predicates, the better performance can be achieved.

Figure 6E:
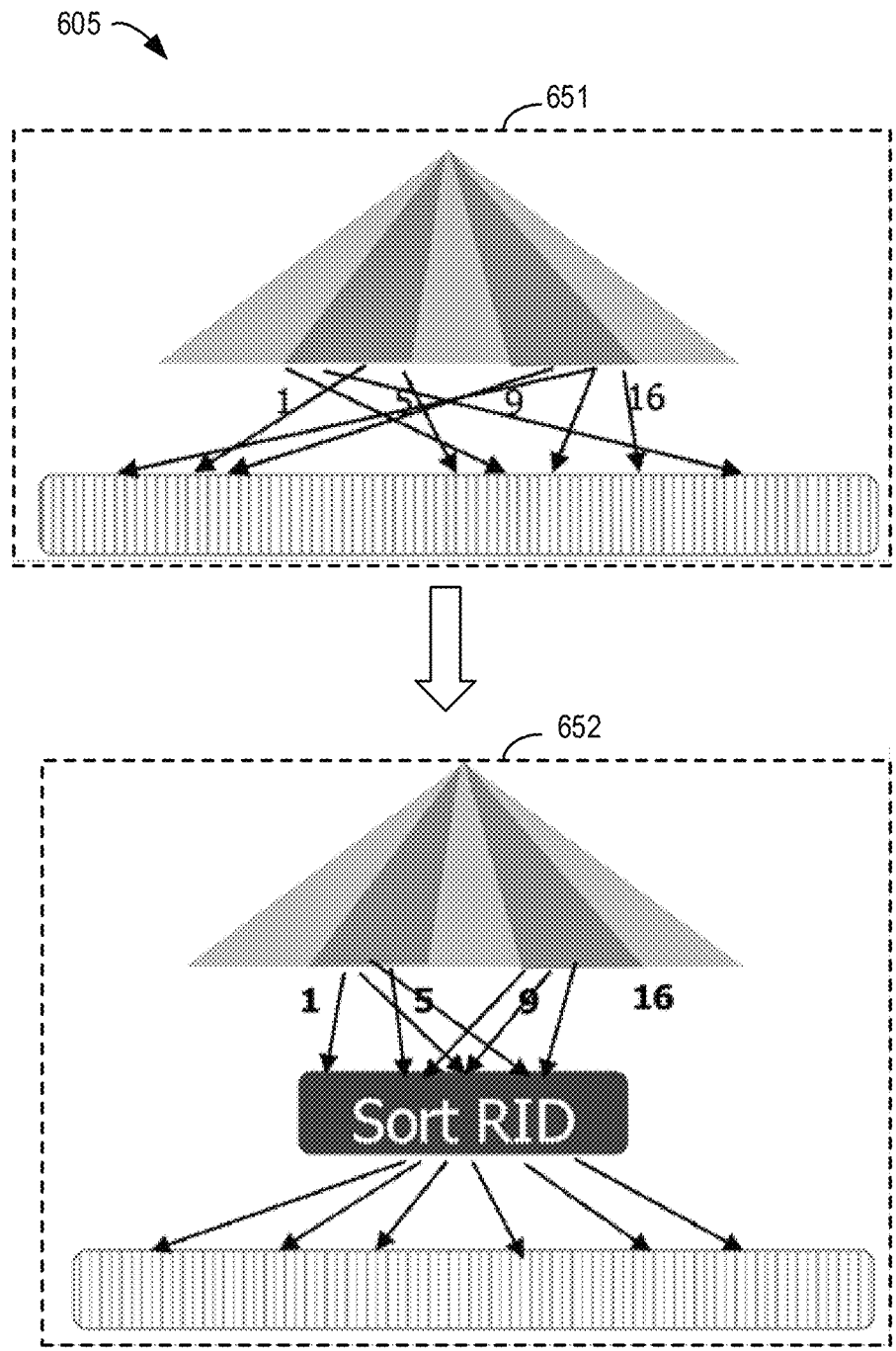

Moreover, index-scan multiplexing can be beneficial even if there is no overlap/intersection among the ranges of local predicates, when the index cluster ratio is poor. The schematic diagram 605 in FIG. 6E shows such an example. In the example, the local predicates have a range between 1 and 5 and a range between 9 and 16, respectively, which are not overlapped. The access pattern 651 shows an access to pages where the related records are stored when index scan is not multiplexed. The access pattern 652 shows an access to pages where the related records are stored when index scan is multiplexed and the selected recorded are sorted by row ID (RID). As can be seen from FIG. 6E, access to the pages is regulated in the case where the index-scan is multiplexed as compared to the case where the index-scan is not multiplexed. In this way, input/output (I/O) performance is improved.

As can be seen from FIG. 6C, the multiplexing of index-scan would generate the intermediate result, for example, the temporary work files 621 and 622, which would require storage resource. This additional cost may be evaluated by database optimizer. Query performance will be beneficial when size of index is huge but the size of generated work files is relevant small.

It is to be understood that although the example queries described with reference to FIGS. 5A-5D and FIGS. 6A-6E comprise inner join operations, the scan multiplexing including table-scan multiplexing and index-scan multiplexing can be applied to other types of join operation, for example left join, right join and full join.

In some embodiments, sort operation may be multiplexed. Reference is now made to FIGS. 7A-7E, which depict schematic diagrams for multiplexing sort operation according to some embodiments of the present disclosure. In the schematic diagram 701, a query 710 in a form of a SQL statement may be an example of the query 410. In the query 710, the table named "Tab" (which may be referred to as Tab hereinafter) is referenced twice in a sub query 711 and a sub query 712. The sub query 711 indicates a data operation to group records satisfying the local predicate 713 based on C1 and C2 columns, and the local predicate 713 is a scan condition when the Tab is treated as table A. The sub query 712 indicates a data operation to group records satisfying the local predicate 714 based on C2 and C3 columns, and the local predicate 714 is a scan condition when the Tab is treated as table B.

Figure 7B:
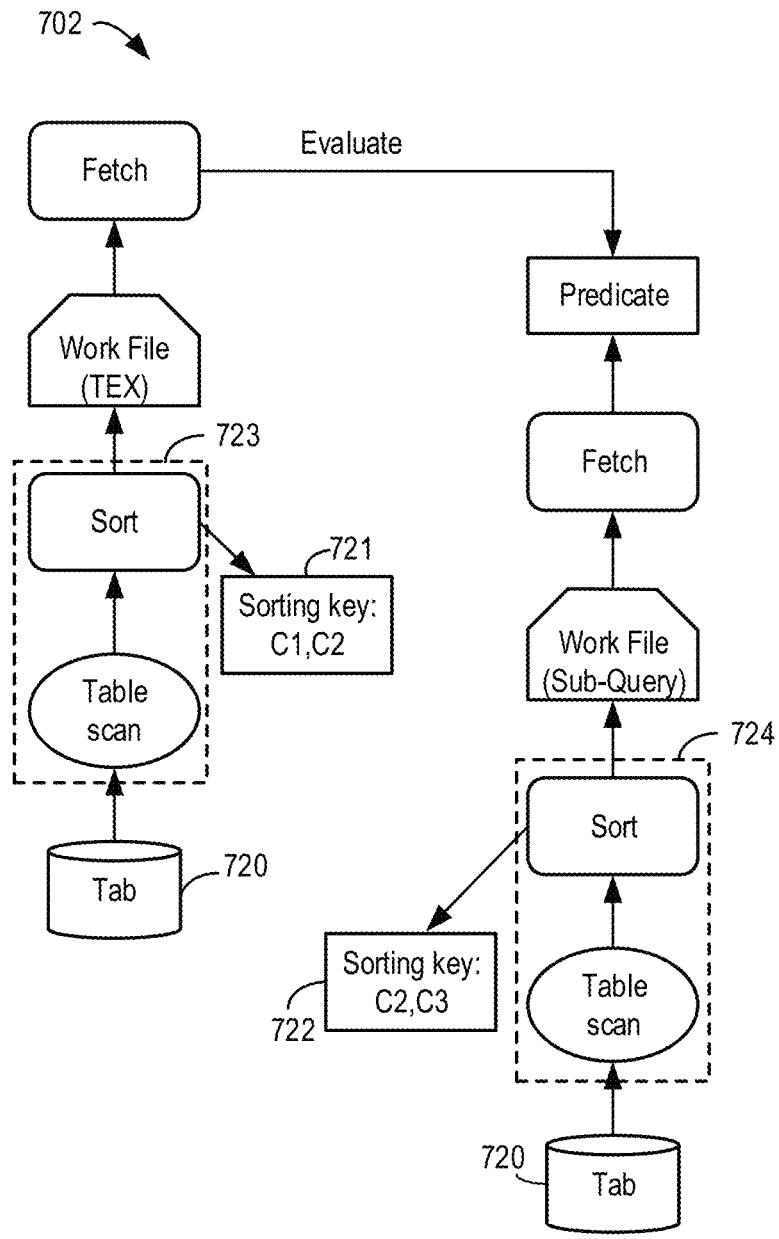

FIG. 7B depicts an execution path 702 for the query 710 where the sort operation is not multiplexed. As shown in the sub path 723, the Tab 720 is table-scanned to select the data records satisfying the local predicate 713 and then the selected records are sorted by the sorting key 721, i.e. the C1 and C2 columns in this example. As shown in the sub path 724, the Tab 720 is table-scanned to select the data records satisfying the local predicate 714 and then the selected records are sorted by the sorting key 722, i.e. the C2 and C3 columns in this example. Accordingly, two table-scan operations and two sort operations would be performed on the same table Tab.

Figure 7C:
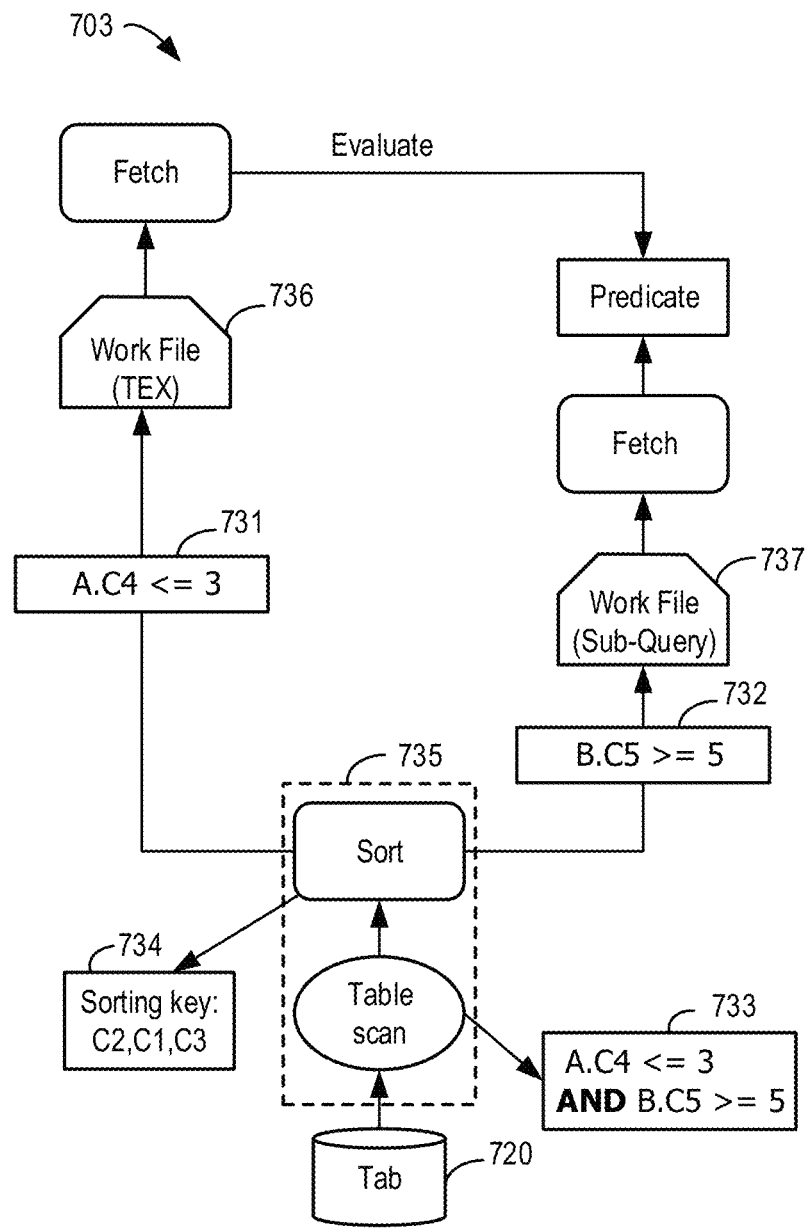

FIG. 7C depicts an execution path 703 for the query 710 where the sort operation is multiplexed according to some embodiments of the present disclosure. To multiplex the sort operation, the common column of the two sets of GROUP BY keys is located. In this example, the C2 column is the common column of the two sets of GROUP BY keys. A union of the two sets of GROUP BY keys may be determined as the sorting keys and the common column C2 is used as the leading key of the sorting keys. In some embodiments, the order of the remaining sort keys may be determined randomly. In some embodiments, the order of the remaining sort keys may be determined based on the multi-column cardinalities of the common column C2 and the remaining sorting keys. For example, if the multi-column cardinality of the common column C2 and the C1 column (C2, C1) is greater than the multi-column cardinality of the common column C2 and the C3 column (C2, C3), C1 column is determined as the key subsequent to the leading key. As shown in FIG. 7C, the sorting key 734 are determined as C2, C1 and C3 columns. In this way, multiple sort operations can be consolidated into a single sort process by sort operation multiplex.

In addition to sort operation multiplex, table-scan is also multiplexed in the example shown in FIG. 7C. Similar as described above with reference to FIG. 5C, to multiplex the table-scan, the local predicates 713 and 714 are located and a target condition may be determined based on the local predicates 713 and 714. For example, a union operation and an intersection operation may be performed on the local predicates 713 and 714. The target condition, which in this example may be also referred to as a combined local predicate, may be determined as a union of the local predicates 713 and 714. Accordingly, the combined local predicate may comprise a first portion 731, a second portion 732 and a third portion 733, which is an intersection of the local predicates 713 and 714.

As shown in the sub path 735, a single table-scan process is performed on the Tab 720 to select data records satisfying the combined local predicate from the plurality of data records of the Tab 720. The selected data records are then sorted using the sorting key 734 in an order of C2, C1 and C3. In other words, the sorting operation with the sorting keys C1, C2 and the sorting operation with the sorting keys C2, C3 are combined into a target sorting operation to sort the selected records satisfying the combined local predicates.

Figure 7D:
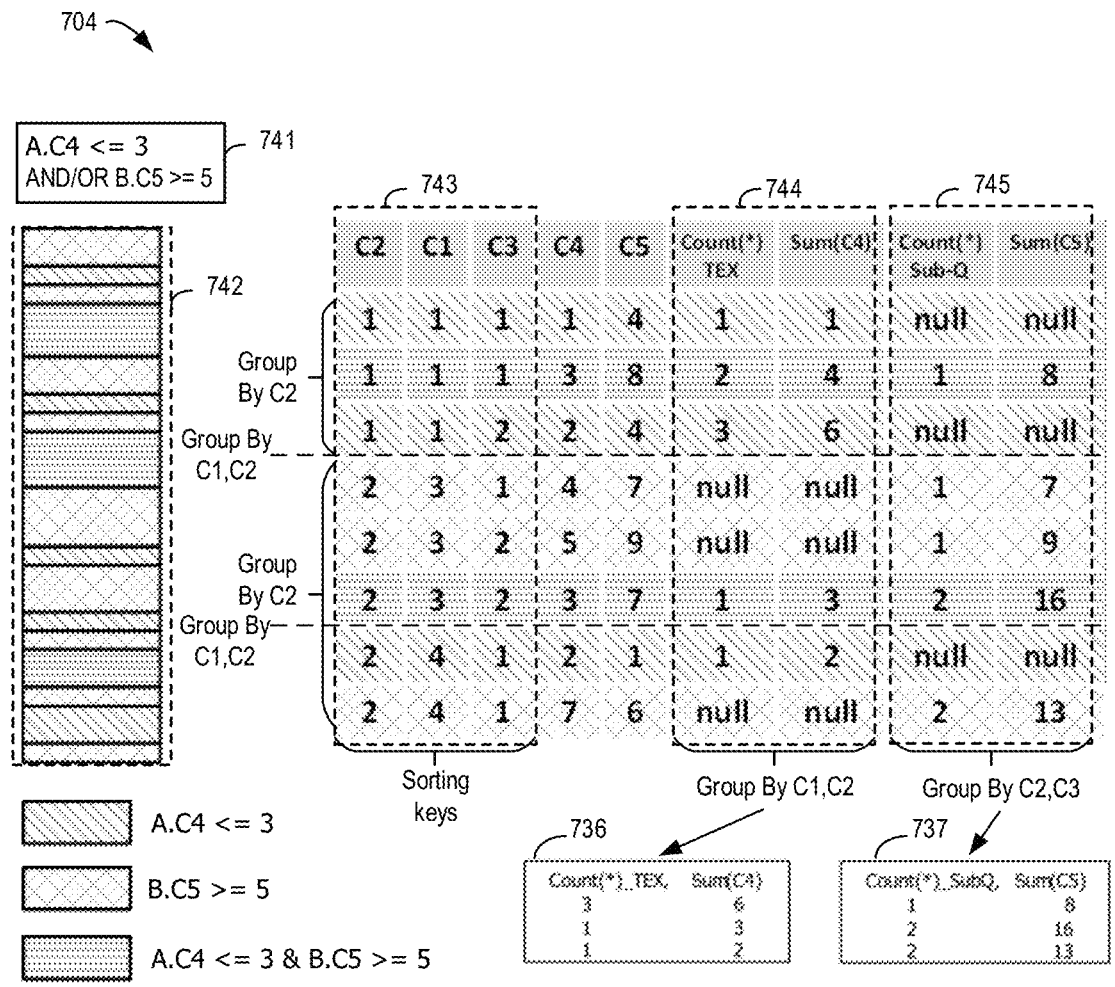

During the single sorting process, all the GROUP BY and aggregate function evaluation as indicated in the query 710 is performed to generate the intermediate result, for example the work files 736 and 737 as shown in FIG. 7C. Reference is now made to FIG. 7D. Schematic diagram 704 for multiplexing sort operation is depicted. The records 742 are selected from the Tab 720 by the single table-scan with the combined local predicate 741, which is a union of the local predicates 713 and 714. The different shading shapes of the selected records 742 mean that the respective record satisfies only the local predicate 713, only the local predicate 714 and both the local predicates 713 and 714.

As shown in the dashed box 743, the selected records 742 are sorted by the sorting keys C2, C1, C3. As shown in the dashed box 744, the sorted records 742 are grouped by C1 and C2 in view of the local predicate 713 and the grouping results are shown in the dashed box 744. As shown in the dashed box 745, the sorted records 742 are grouped by C2 and C3 in view of the local predicate 714 and the grouping results are shown in the dashed box 745. The work file 736 corresponding to the sub query 711 and the work file 737 corresponding to the sub query 712 are generated based on the grouping results as shown in the dashed boxes 744 and 745, as the intermediate result of the query 710.

Referring to FIG. 7C, the intermediate result, for example the generated work files 736 and 737, can be used to proceed with the remaining process to determine the result of the query 710. The execution path 703 involves both sort operation multiplex and table-scan multiplex. In some embodiments, execution path may involve only sort operation multiplex, for example if there is no locate predicate on the Tab 720.

Figure 7E:
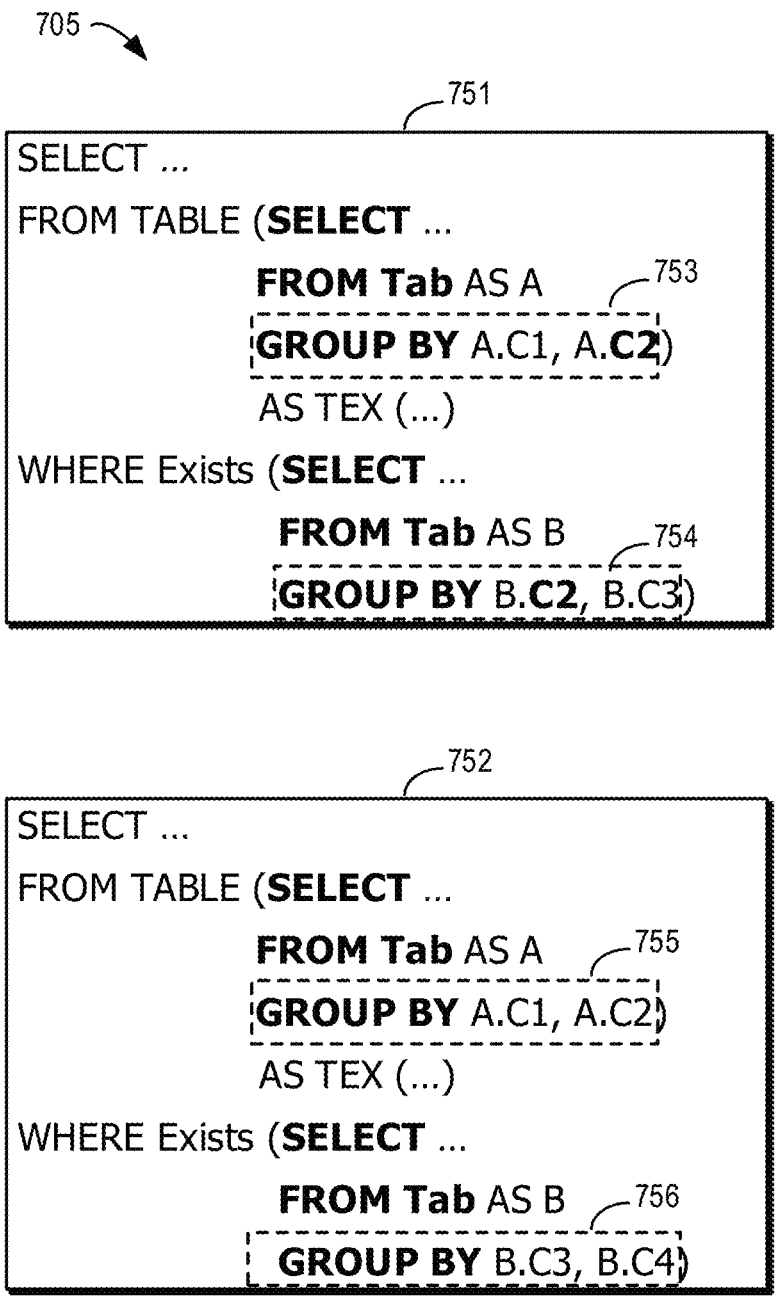

It is to be understood that the example SQL statement shown in FIG. 7A is merely an example without limitation. The sort operation can be multiplexed when there exists at least one common column between the GROUP BY clauses. The schematic diagram 705 in FIG. 7E shows some example queries 751 and 752 in form of SQL statement. In the example query 751, the table "Tab" is referenced twice in the two sub queries. The GROUP BY clauses 753 and 754 specify a common column of the Tab, that is, the C2 column of the table Tab. Therefore, sort operation can be multiplexed for the example query 751. In the example query 752, the table "Tab" is referenced twice in the two sub queries, however, there is no common column between the GROUP BY clauses 755 and 756. Therefore, sort operation cannot be multiplexed for the example query 752.

In such embodiments, sort operation is multiplexed to reduce the times of sort operation against same table. In this way, database query performance can be improved significantly. Experiments show that database query may have a performance improvement of about 28.69%~57.43% with the sort operation multiplex. The more common coverage, the better sort performance can be achieved.

In some embodiments, join operation may be multiplexed. Reference is now made to FIGS. 8A-8D, which depict schematic diagrams for multiplexing join operation according to some embodiments of the present disclosure. In the schematic diagram 801, a query 810 in a form of a SQL statement may be an example of the query 810. In the query 810, the table named "TAB_2" (which may be referred to as TAB_2 hereinafter) and the table named "TAB_3" (which may be referred to as TAB_3 hereinafter) are referenced by the first join composite 811 and also by the second join composite 812. The query 810 indicates a first join operation on the TAB_2 and TAB_3 with a first join predicate 813 in view of the local predicates 815. The query 810 also indicates a second join operation on the TAB_2 and TAB_3 with a second join predicate 814 in view of the local predicate 816.

Figure 8A:
Figure 8A:
Figure 8A:
Figure 8B:
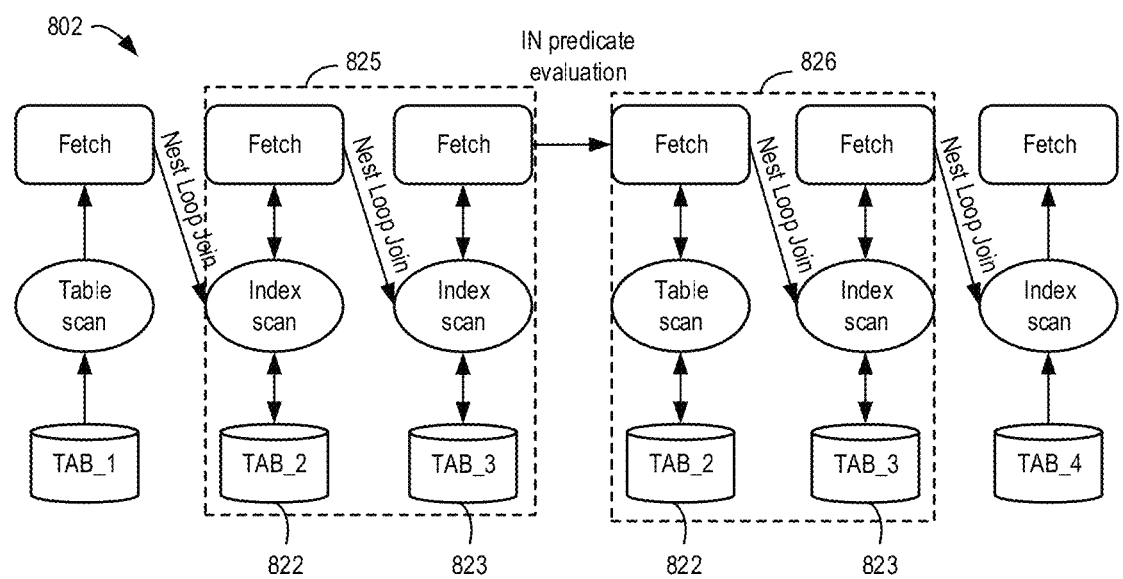

FIG. 8B depicts an execution path 802 for the query 810 where the join operation is not multiplexed. It is assumed in this example that index is created on the C1 column for the TAB_2, index is created on the C2 column for the TAB_3 and index is created on the C3 column for the TAB_4. As shown in the sub path 825, a first join operation (shown as a nest loop join as an example) is performed on the TAB_2 822 and the TAB_3 823 under the join predicate 813. As shown in the sub path 826, a second join operation (also shown as a nest loop join as an example) is performed on the TAB_2 822 and the TAB_3 823 under the join predicate 814.

Figure 8C:
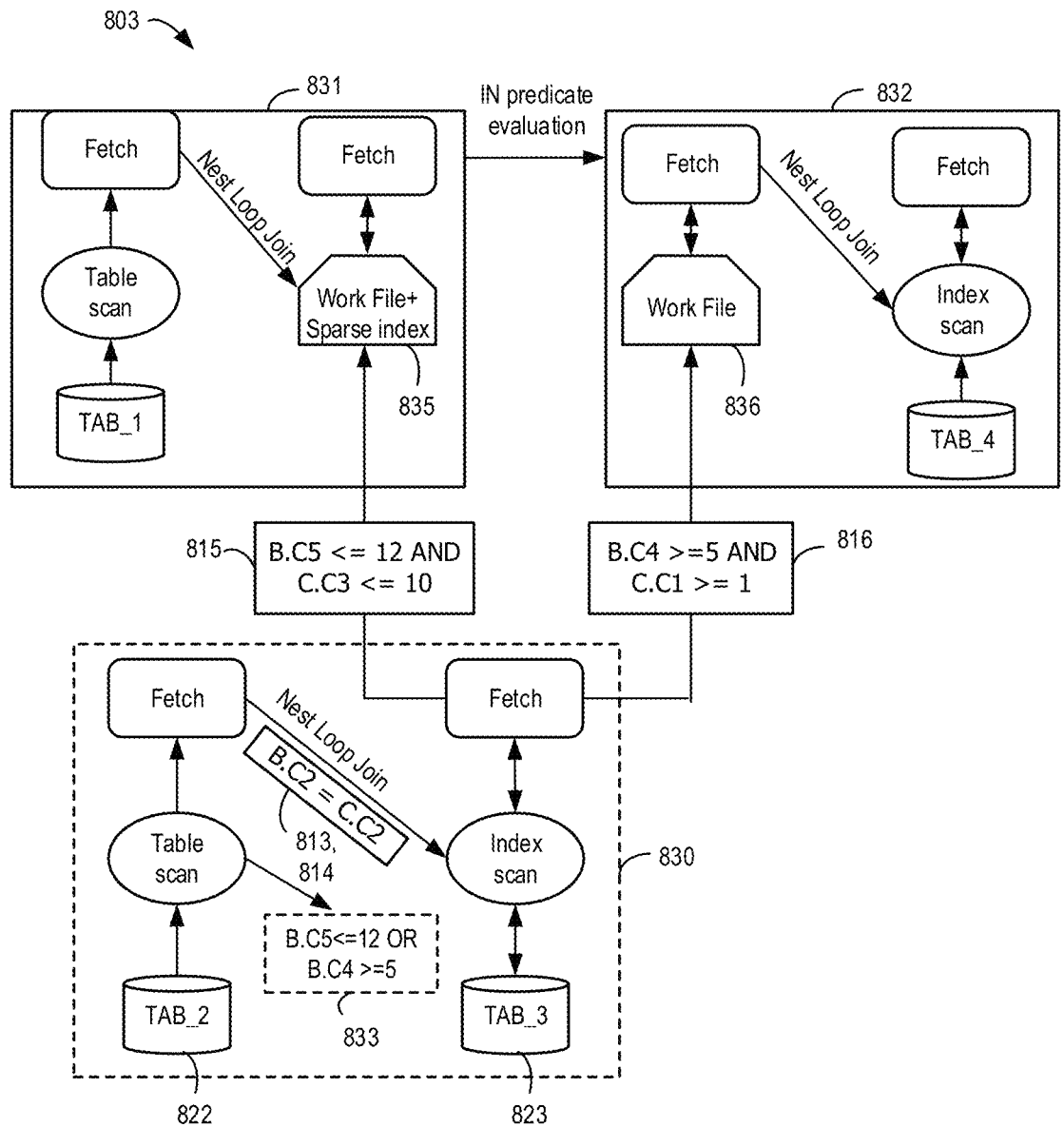

FIG. 8C depicts an execution path 803 for the query 810 where the join operation is multiplexed according to some embodiments of the present disclosure. The join composites 811 and 812 which are the same are located. The join predicates 813 and 814 of the join composites 811 and 812 are also located. Since the join predicates 813 and 814 are the same, the first and second join operations can be combined into a single join operation to join records from the TAB_2 822 with records from the TAB_3 823. In other words, the join operation is multiplexed. For example, as shown in the sub path 830, a single join operation (which is shown as a nest loop join) is performed on the TAB_2 822 and the TAB_3 823.

By joining the records from the TAB_2 822 with the records from the TAB_3 823 based on the join predicates 813 and 814, the intermediate result of the query 810 can be generated. For example, the work files 835 and 836 may be generated to store the joined records. To generate the intermediate result, the local predicates 815 and 816 are also located. In some embodiments, the local predicates 815 and 816 may be used as described above with respect to table-scan multiplex and/or index-scan multiplex. In some embodiments, each of the joined records obtained from the single join operation (as shown in the sub path 830) may be evaluated based on the local predicates 815 and 816 and be added to at least one of the work files 835 and 836 based on the evaluation.

Next, a final result of the query 810 is determined based on the work files 835 and 836. For example, as shown in the sub path 831, a nest loop join operation is performed on the TAB_1 and the work file 835. As shown in the sub path 832, another nest join operation is performed on the work file 836 and the TAB_4. Then, an IN predicate evaluation is performed to determine the final result. In some embodiments, a sparse index may be added to the work file 835 to avoid full scan of the records in the work file 835 when the nest loop join is performed.

Still refer to the sub path 830. In some embodiments, a combined condition for selecting records from the TAB_2 822 may be applied when the TAB_2 822 is table-scanned. The local predicate 815 comprises a condition for selecting records from the TAB_2 822, which is represented as "B.C5<=12", while the local predicate 816 comprises a condition for selecting records from the TAB_2 822, which is represented as "B.C4>=5". The combined condition 833 may be determined as a union of the above conditions, as shown in FIG. 8C. The records selected from the TAB_2 822 based on the combined condition 833 are joined with the records from the TAB_3 823. The determination of which local predicate and/or which portion of a local predicate is used to determine the combined condition may be based on the filter factor of each of the local predicates.

The join operation can be multiplexed when a same join composite and a same join predicate of the join composite are located in a query. In other words, the join operation can be multiplexed when there exists at least one common 'join predicate' against the same 'join composite' among related predicates. For example, in the example SQL statement shown in FIG. 8A, the join composites 811 and 812 are the same and the join predicates 813 and 814 are the same. The schematic diagram 804 in FIG. 8D shows another example query 845 in form of SQL statement. In the example query 845, the join composites 841 and 842 are the same but the join predicates 843 and 844 are different. Accordingly, join operation cannot be multiplexed for the query 845. It is to be understood that join operation multiplex has no requirement on the local predicates.

In such embodiments, join operation is multiplexed to reduce the times of same tables join under different sub-queries. In this way, database query performance can be improved significantly. Experiments show that database query may have a performance improvement of about 18.74%~43.62% with the join operation multiplex.

As can be seen from FIG. 8C, the multiplex of join operation would generate the intermediate result, for example, the temporary work files 835 and 836, which would require additional storage resource. This additional cost may be evaluated by database optimizer. Query performance will be quite beneficial when the size of the tables to be joined (for example TAB_2 and TAB_3) is huge but the size of the join result is relevant small.

In the foregoing, different types of data operation multiplex, such as table-scan multiplex, index-scan multiplex, sort operation multiplex and join operation multiplex, are described. In some embodiments, each of the different types of data operation multiplex may be implemented individually. In some embodiments, some of the different types of data operation multiplex may be implemented in combination. For example, in the embodiments described with reference to FIG. 7C, table-scan multiplex and sort operation multiplex are implemented simultaneously.

It should be noted that the processing of multiplexing data operation according to embodiments of this disclosure could be implemented by computer system/server 12 of FIG. 1.

Figure 9:
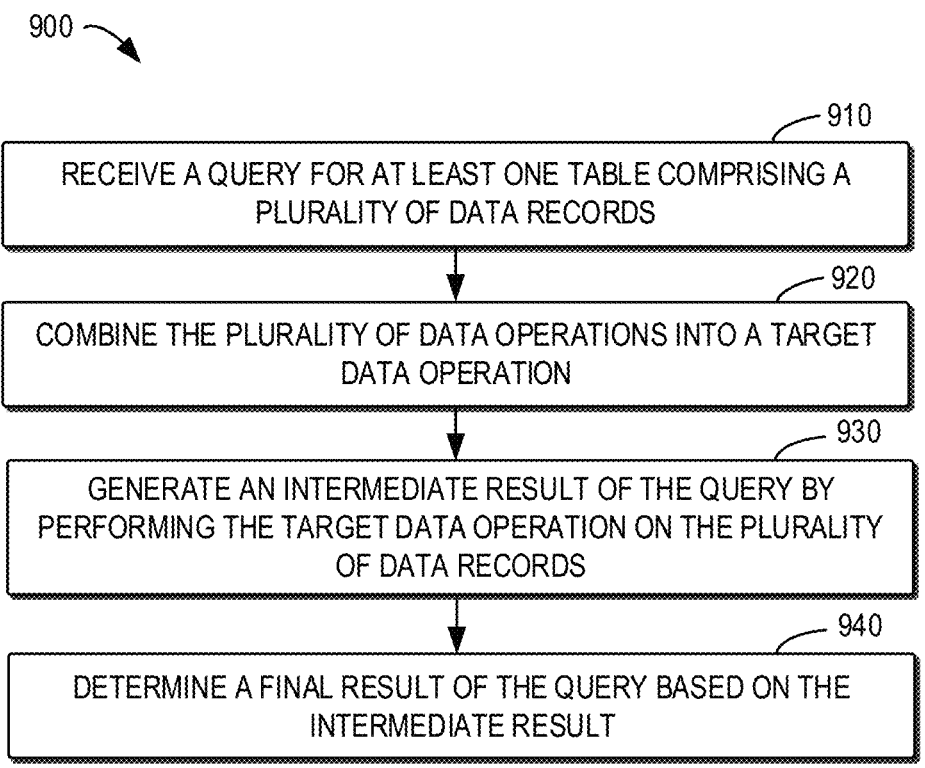
FIG. 9 depicts a flowchart of an example method for multiplexing data operation according to some embodiments of the present disclosure.

FIG. 9 depicts a flowchart of an example method 900 for multiplexing data operation according to embodiments of the present disclosure. For example, the method 900 may be implemented by the computer system/server 12 of FIG. 1. It is to be understood that the method 900 may also comprise additional blocks (not shown) and/or may omit the illustrated blocks. The scope of the present disclosure described herein is not limited in this aspect.

At block 910, the computer system/server 12 receives a query (e.g., any of the queries 510, 610, 710, 810) for at least one table comprising a plurality of data records. The query indicates a plurality of data operations to be performed on the plurality of data records. For example, the query 410 indicates a first table-scan and a second table-scan on the Tab.

At block 920, the computer system/server 12 combines the plurality of data operations into a target data operation. For example, the target data operation may be any of a table-scan, an index-scan, a sort operation, a join operation or combination thereof. At block 930, the computer system/server 12 generates an intermediate result of the query by performing the target data operation on the plurality of data records. For example, appropriate work files may be generated as the intermediate result. At block 940, the computer system/server 12 determines a final result of the query based on the intermediate result.

In some embodiments, the plurality of data operations may be used to select data records satisfying respective conditions from the plurality of data records. The computer system/server 12 may determine a union of the conditions as a target condition and combine the plurality of data operations into the target data operation to select data records satisfying the target condition from the plurality of data records. For example, table-scan or index-scan may be multiplexed. In some embodiments, the computer system/server 12 may select data records satisfying the target condition from the plurality of data records and generate the intermediate result of the query by dividing the selected data records into a plurality of groups. Each group may satisfy one of the conditions. As an example, the work files 521 and 522 may be generated. As another example, the work files 621 and 622 may be generated. In some embodiments, the plurality of data operations may be connected by a join operation. The computer system/server 12 may determine the final result of the query by performing the join operation on the plurality of groups of data records. In some embodiments, the conditions may be associated with a same column of the at least one table. The computer system/server 12 may perform the target data operation on the column of the at least one table.

In some embodiments, the plurality of data operations may comprise a first data operation grouping a first set of data records based on a first set of columns and a second data operation grouping a second set of data records based on a second set of columns. If the first and second sets of columns comprise a same column, the computer system/server 12 may determine a union of the first set of columns and the second set of columns as a set of sorting keys. The same column may act as a leading key of the set of sorting keys. The computer system/server 12 may determine a third set of data records based on the first and second set of data records and combine the first and second data operations into the target data operation to sort the third set of data records based on the set of sorting keys.

In some embodiments, the computer system/server 12 may sort the third set of data records based on the set of sorting keys. The computer system/server 12 may generate a first grouping result by grouping the sorted third set of data records based on the first set of columns and a second grouping result by grouping the sorted third set of data records based on the second set of columns. The computer system/server 12 may generate the intermediate result based on the first and second grouping results.

In some embodiments, the query may indicate a first condition for selecting the first set of data records from the plurality of records and a second condition for selecting the second set of data records from the plurality of records. The computer system/server 12 may determine a union of the first and second conditions as a target condition, and select from the at least one table the third set of data records satisfying the target condition.

In some embodiments, the at least one table may comprise first and second tables and the plurality of data operations may comprise a plurality of join operations to be performed on the first and second tables. If the plurality of join operations is associated with a same join condition, the computer system/server 12 may combine the plurality of data operations into the target data operation to join a first set of data records from the first table and a second set of data records from the second table based on the join condition. In some embodiments, the computer system/server 12 may generate the intermediate result of the query by joining the first set of data records from the first table and the second set of data records from the second table based on the join condition. In some embodiments, the query may indicate a plurality of conditions for selecting the first set of data records from the first table. The computer system/server 12 may further determine a union of the plurality of conditions as a target condition, and select from the first table the first set of data records satisfying the target condition.

As can be seen from the above, according to embodiments of the present disclosure, the plurality of data operations for at least one same table can be combined into a target data operation. By multiplexing the target data operation, the times for processing the same table(s) can be reduced. For example, the times for accessing the same table, the times for sorting the same table and/or the times for joining the same tables can be reduced. As such, the database query performance can be improved.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by one or more processors, a query in a structured query language for at least one database table comprising a plurality of data records, the query indicating a plurality of data operations to be performed on the plurality of data records, the query referencing the at least one database table multiple times, each table reference comprises a data operation, of the plurality of data operations, to be performed on the at least one database table, the plurality of data operations is used to select data records satisfying respective conditions from the plurality of data records, the plurality of data operations comprises a first data operation grouping a first set of data records based on a first set of columns and a second data operation grouping a second set of data records based on a second set of columns;
combining, by one or more processors, the plurality of data operations into a single target data operation in the structured query language, the plurality of data operations comprising different types of data operations implemented simultaneously on the plurality of data records, the target data operation selects data records, from the plurality of data records, which satisfy a target condition comprising a union and an intersection of the respective conditions, the combining comprising:
in response to determining that the first and the second sets of columns comprise a same column, determining a union of the first set of columns and the second set of columns as a set of sorting keys, the same column acting as a leading key of the set of sorting keys, an order of remaining sorting keys, of the set of sorting keys, being based on multi-column cardinality of the same column and the remaining sorting keys;
determining a third set of data records based on the first and the second set of data records; and
combining, by one or more processors, the first and the second data operations into the target data operation to sort the third set of data records based on the set of sorting keys;
generating, by one or more processors, work files to store an intermediate result of the query, the work files comprising data records selected by performing the target data operation on the at least one database table, wherein a sparse index is added to the work files to avoid a full scan of data records contained therein; and
determining, by one or more processors, a final result of the query by executing the query on data records of the work files.

2. The computer-implemented method of claim 1, wherein generating the intermediate result of the query comprises:
selecting, by one or more processors, data records satisfying the target condition from the plurality of data records; and
generating, by one or more processors, the intermediate result of the query by dividing the selected data records into a plurality of groups of data records, each group satisfying one of the conditions of the union of the conditions of the target condition, each group being stored in a respective work file of the work files.

3. The computer-implemented method of claim 2, wherein the plurality of data operations is connected by a join operation, and determining the final result of the query comprises:
determining, by one or more processors, the final result of the query by performing the join operation on the plurality of groups of data records.

4. The computer-implemented method of claim 1, wherein the conditions are associated with a same column of the at least one table, and performing the target data operation on the at least one table comprises:
performing, by one or more processors, the target data operation on the column of the at least one table.

5. The computer-implemented method of claim 1, wherein generating the intermediate result of the query comprises:
sorting, by one or more processors, the third set of data records based on the set of sorting keys;
generating, by one or more processors, a first grouping result by grouping the sorted third set of data records based on the first set of columns and a second grouping result by grouping the sorted third set of data records based on the second set of columns; and
generating, by one or more processors, the intermediate result based on the first and second grouping results.

6. The computer-implemented method of claim 1, wherein the query indicates a first condition for selecting the first set of data records from the plurality of records and a second condition for selecting the second set of data records from the plurality of records, and determining the third set of data records comprises:
determining, by one or more processors, a union of the first and second conditions as a target condition; and
selecting, by one or more processors, from the at least one table the third set of data records satisfying the target condition.

7. The computer-implemented method of claim 1, wherein the at least one table comprises first and second tables and the plurality of data operations comprises a plurality of join operations to be performed on the first and second tables, and combining the plurality of data operations into the target data operation comprises:
in accordance with a determination that the plurality of join operations are associated with a same join condition, combining, by one or more processors, the plurality of data operations into the target data operation to join a first set of data records from the first table and a second set of data records from the second table based on the join condition.

8. The computer-implemented method of claim 7, wherein generating the intermediate result of the query comprises:
generating, by one or more processors, the intermediate result of the query by joining the first set of data records from the first table and the second set of data records from the second table based on the join condition.

9. The computer-implemented method of claim 7, wherein the query indicates a plurality of conditions for selecting the first set of data records from the first table, and the computer-implemented method further comprises:
determining, by one or more processors, a union of the plurality of conditions as a target condition; and
selecting, by one or more processors, from the first table the first set of data records satisfying the target condition.

10. A computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions, when executed by at least one of the one or more processors, performing actions comprising:
- receiving a query in a structured query language for at least one database table comprising a plurality of data records, the query indicating a plurality of data operations to be performed on the plurality of data records, the query referencing the at least one database table multiple times, each table reference comprises a data operation, of the plurality of data operations, to be performed on the at least one database table, the plurality of data operations is used to select data records satisfying respective conditions from the plurality of data records, the plurality of data operations comprises a first data operation grouping a first set of data records based on a first set of columns and a second data operation grouping a second set of data records based on a second set of columns;
- combining the plurality of data operations into a single target data operation in the structured query language, the plurality of data operations comprising different types of data operations implemented simultaneously on the plurality of data records, the target data operation selects data records, from the plurality of data records, which satisfy a target condition comprising a union and an intersection of the respective conditions, the combining comprising:
  - in response to determining that the first and the second sets of columns comprise a same column, determining a union of the first set of columns and the second set of columns as a set of sorting keys, the same column acting as a leading key of the set of sorting keys, an order of remaining sorting keys, of the set of sorting keys, being based on multi-column cardinality of the same column and the remaining sorting keys;
  - determining a third set of data records based on the first and the second set of data records; and
  - combining, by one or more processors, the first and the second data operations into the target data operation to sort the third set of data records based on the set of sorting keys;
- generating work files to store an intermediate result of the query, the work files comprising data records selected by performing the target data operation on the at least one database table, wherein a sparse index is added to the work files to avoid a full scan of data records contained therein; and
- determining a final result of the query by executing the query on data records of the work files.

11. The computer system of claim 10, wherein generating the intermediate result of the query comprises:
- selecting data records satisfying the target condition from the plurality of data records; and
- generating the intermediate result of the query by dividing the selected data records into a plurality of groups of data records, each group satisfying one of the conditions of the union of the conditions of the target condition, each group being stored in a respective work file of the work files.

12. The computer system of claim 11, wherein the plurality of data operations is connected by a join operation, and determining the final result of the query comprises:
- determining the final result of the query by performing the join operation on the plurality of groups of data records.

13. The computer system of claim 10, wherein the conditions are associated with a same column of the at least one table, and performing the target data operation on the at least one table comprises:
- performing the target data operation on the column of the at least one table.

14. The computer system of claim 10, wherein generating the intermediate result of the query comprises:
- sorting the third set of data records based on the set of sorting keys;
- generating a first grouping result by grouping the sorted third set of data records based on the first set of columns and a second grouping result by grouping the sorted third set of data records based on the second set of columns; and
- generating the intermediate result based on the first and second grouping results.

15. The computer system of claim 10, wherein the query indicates a first condition for selecting the first set of data records from the plurality of records and a second condition for selecting the second set of data records from the plurality of records, and determining the third set of data records comprises:
- determining a union of the first and second conditions as a target condition; and
- selecting from the at least one table the third set of data records satisfying the target condition.

16. The computer system of claim 10, wherein the at least one table comprises first and second tables and the plurality of data operations comprises a plurality of join operations to be performed on the first and second tables, and combining the plurality of data operations into the target data operation comprises:
- in accordance with a determination that the plurality of join operations are associated with a same join condition, combining the plurality of data operations into the target data operation to join a first set of data records from the first table and a second set of data records from the second table based on the join condition.

17. The computer system of claim 16, wherein generating the intermediate result of the query comprises:
- generating the intermediate result of the query by joining the first set of data records from the first table and the second set of data records from the second table based on the join condition.

18. The computer system of claim 16, wherein the query indicates a plurality of conditions for selecting the first set of data records from the first table, and the actions further comprise:
- determining a union of the plurality of conditions as a target condition; and
- selecting from the first table the first set of data records satisfying the target condition.

19. A computer program product, the computer program product comprising:
- one or more non-transient computer-readable tangible storage media and program instructions collectively stored on the one or more non-transient computer-readable tangible storage media, the program instructions being executable by a computer, the program instructions comprising:
  - program instructions to receive a query in a structured query language for at least one database table comprising a plurality of data records, the query indicating a plurality of data operations to be performed on the plurality of data records, the query referencing the at least one database table multiple times, each table reference comprises a data operation, of the plurality of data operations, to be performed on the at least one database table, the plurality of data operations is used to select data records satisfying respective conditions from the plurality of data records, the plurality of data operations comprises a first data operation grouping a first set of data records based on a first set of columns and a second data operation grouping a second set of data records based on a second set of columns;

program instructions to combine the plurality of data operations into a single target data operation in the structured query language, the plurality of data operations comprising different types of data operations implemented simultaneously on the plurality of data records, the target data operation selects data records, from the plurality of data records, which satisfy a target condition comprising a union and an intersection of the respective conditions, the program instructions to combine comprising:

in response to determining that the first and the second sets of columns comprise a same column, determining a union of the first set of columns and the second set of columns as a set of sorting keys, the same column acting as a leading key of the set of sorting keys, an order of remaining sorting keys, of the set of sorting keys, being based on multi-column cardinality of the same column and the remaining sorting keys;

determining a third set of data records based on the first and the second set of data records; and combining, by one or more processors, the first and the second data operations into the target data operation to sort the third set of data records based on the set of sorting keys;

program instructions to generate work files to store an intermediate result of the query, the work files comprising data records selected by performing the target data operation on the at least one database table, wherein a sparse index is added to the work files to avoid a full scan of data records contained therein; and program instructions to determine a final result of the query by executing the query on data records of the work files.

\* \* \* \* \*